United States Patent [19]

Callebaut et al.

[11] Patent Number: 5,657,687
[45] Date of Patent: Aug. 19, 1997

[54] DEVICE FOR CONCHING CHOCOLATE COMPOUND

[75] Inventors: Frans Callebaut, Bambrugge; Rudy Bruyland, Herdersem, both of Belgium

[73] Assignee: Callebaut N.V., Lebbeke-Weize, Belgium

[21] Appl. No.: 596,091

[22] PCT Filed: Jul. 27, 1994

[86] PCT No.: PCT/EP94/02478

§ 371 Date: Mar. 29, 1996

§ 102(e) Date: Mar. 29, 1996

[87] PCT Pub. No.: WO95/04470

PCT Pub. Date: Feb. 16, 1995

[30] Foreign Application Priority Data

Aug. 4, 1993 [DE] Germany ............... 43 26 075.6

[51] Int. Cl.⁶ ............. A23G 1/00; A23G 1/10; A23G 1/16; B01F 7/02
[52] U.S. Cl. ............. 99/485; 99/348; 99/472; 366/139; 366/155.1; 366/156.1; 366/196; 366/291; 366/158.4; 366/297; 366/301
[58] Field of Search ............. 99/485, 486, 348, 99/472–474, 479, 452–455, 494; 366/75, 85, 151.1, 152.2, 155.1, 156.1, 291, 158.4, 297, 301, 309, 139, 141, 196, 601; 426/231, 519, 660

[56] References Cited

U.S. PATENT DOCUMENTS

| | | | |
|---|---|---|---|
| 3,628,965 | 12/1971 | Nijkerk | 99/479 X |
| 3,634,106 | 1/1972 | Organ et al. | 99/485 |
| 3,663,231 | 5/1972 | Tourell | 99/485 |
| 3,955,489 | 5/1976 | Goerling et al. | 99/485 |
| 4,679,498 | 7/1987 | Chaveron et al. | 366/75 |
| 4,878,426 | 11/1989 | Tadema | 99/485 |
| 5,156,867 | 10/1992 | Leuthold et al. | 426/231 |
| 5,200,220 | 4/1993 | Capodieci | 99/348 X |
| 5,320,427 | 6/1994 | Callebaut et al. | 366/309 X |
| 5,332,588 | 7/1994 | Capodieci | 366/601 X |
| 5,351,609 | 10/1994 | Muntener | 99/485 |
| 5,353,696 | 10/1994 | Stadelmann et al. | 99/472 |
| 5,450,786 | 9/1995 | Muntener | 99/485 |

FOREIGN PATENT DOCUMENTS

| | | |
|---|---|---|
| 260305 | 9/1911 | Germany . |
| 592523 | 5/1930 | Germany . |
| 1182037 | 11/1964 | Germany . |
| 7507723 | 12/1975 | Germany . |
| 3918813 | 12/1989 | Germany . |
| 4021305 | 1/1992 | Germany . |
| 405910 | 7/1966 | Switzerland . |

*Primary Examiner*—Timothy F. Simone
*Attorney, Agent, or Firm*—Sughrue, Mion, Zinn, Macpeak & Seas

[57] ABSTRACT

A conche for producing chocolate compound consists of a conche container (10) with a main chamber (12) and subsidiary chambers (13, 14). Mixing vanes (22, 23 and 30, 31) are disposed therein on central shafts (19, 20, 21) in order to intimately mix the components fed in from above. In order to improve the mixing effect, additional mixing tools in the form of mixing worms (37, 38) are disposed in the lower part of the conche container (10), in particular in the main chamber (12). Stripping means (24, 25) moved along a cylindrical container wall (15) are supported solely in the region of a central transverse plane on a main shaft (19) in the main chamber (12). The main shaft (19) is provided with a clear cross-sectional thickening (28) which at the same time fills a dead space in the conche container (10).

17 Claims, 3 Drawing Sheets

DEVICE FOR CONCHING CHOCOLATE COMPOUND

BACKGROUND OF THE INVENTION

The invention relates to a device (conche) for mixing (conching) components for the production of chocolate compound, with a central main shaft having mixing tools disposed thereon and being rotatable about a horizontal axis in an essentially cylindrical container, especially in a main chamber, and with stripping means revolving along an inner wall surface of the housing in the peripheral direction.

Such a device for conching chocolate compound is known from DE 39 18 813. Such a "classic" conche has a conche container which consists of three axis-parallel cylindrical upwardly open chambers. These are a central main chamber with a greater diameter and two lateral subsidiary chambers. The three chambers merge into one another, thereby forming the conche container. Mixing tools are disposed in each chamber on rotatingly driven shafts.

Heretofore, the conching of chocolate compound has been a time-consuming process. For example, the complete conching of one batch with a conche according to DE 39 18 813 requires 12 h.

SUMMARY OF THE INVENTION

It is therefore the object of the invention to design and further develop a conche for conching chocolate compound in such a way that the period required for conching is reduced considerably, without having to accept an inferior quality of the finished product (chocolate compound).

To attain this object, the device or conche according to the invention is characterized in that—in addition to the usual mixing tools—further mixing means are disposed within the conche container which have an independent drive and take effect in a region outside the area of movement of the mixing tools and the stripping means.

Heretofore, it has been assumed that the classic structure of a conche with vane-like mixing tools on the main shaft and on subsidiary shafts, and with stripping means moving along the wall surface of the container effects an optimal mixing of the components. It is the finding of the invention that additional independently operating mixing tools at least in the main chamber of the conche container effect a clear improvement, especially acceleration, of the mixing effect.

According to a further proposal of the invention, these additional mixing means are several mixing worms which are disposed within the conche container especially in pairs in an intermeshing manner.

An optimal result is attained when in each case two worm units are arranged at both sides of an (imaginary) vertical mid-plane of the main chamber of the conche container in the lower region thereof, in particular at a small distance from a lower cylindrical container wall. In this arrangement, the mixing worms are rotatably mounted unilaterally, i.e. at only one end in an end wall of the conche container.

In the device according to the invention, the stripping means are mounted in a special manner as well, in particular solely in a central transverse plane on the main shaft. The mixing worms which project from both end walls axis-parallel into the interior of the conche container, that is to say the main chamber, end at a (small) distance from the radially directed supporting arms of the stripping means.

According to the invention, specific provisions have also been made in the region of the end walls for the positioning of strippers which are mounted, on the one hand, at the free ends of the stripping means and, on the other hand, on the main shaft at its ends.

The main shaft is exposed to greater strains as a result of the exclusively central support of the stripping means. These are compensated by a cylindrical cross-sectional strengthening. The main shaft is formed almost over the entire length with a cross section which is significantly greater than at the ends. This results in the surprising advantage that a dead space usually formed in this region in conches is filled. This also leads to an improvement of the mixing effect.

A further innovation according to the invention is that the vane-like mixing tools disposed on the main shaft are offset by 90° relative to adjacent mixing tools in the peripheral direction.

Further details of the invention relate to the design and arrangement of the additional mixing tools and stripping means and the design of the main shaft. An exemplary embodiment of the invention will be described hereinafter in more detail with respect to an exemplary embodiment shown in the drawings, in which:

DESCRIPTION OF A PREFERRED EMBODIMENT

Figure 1:
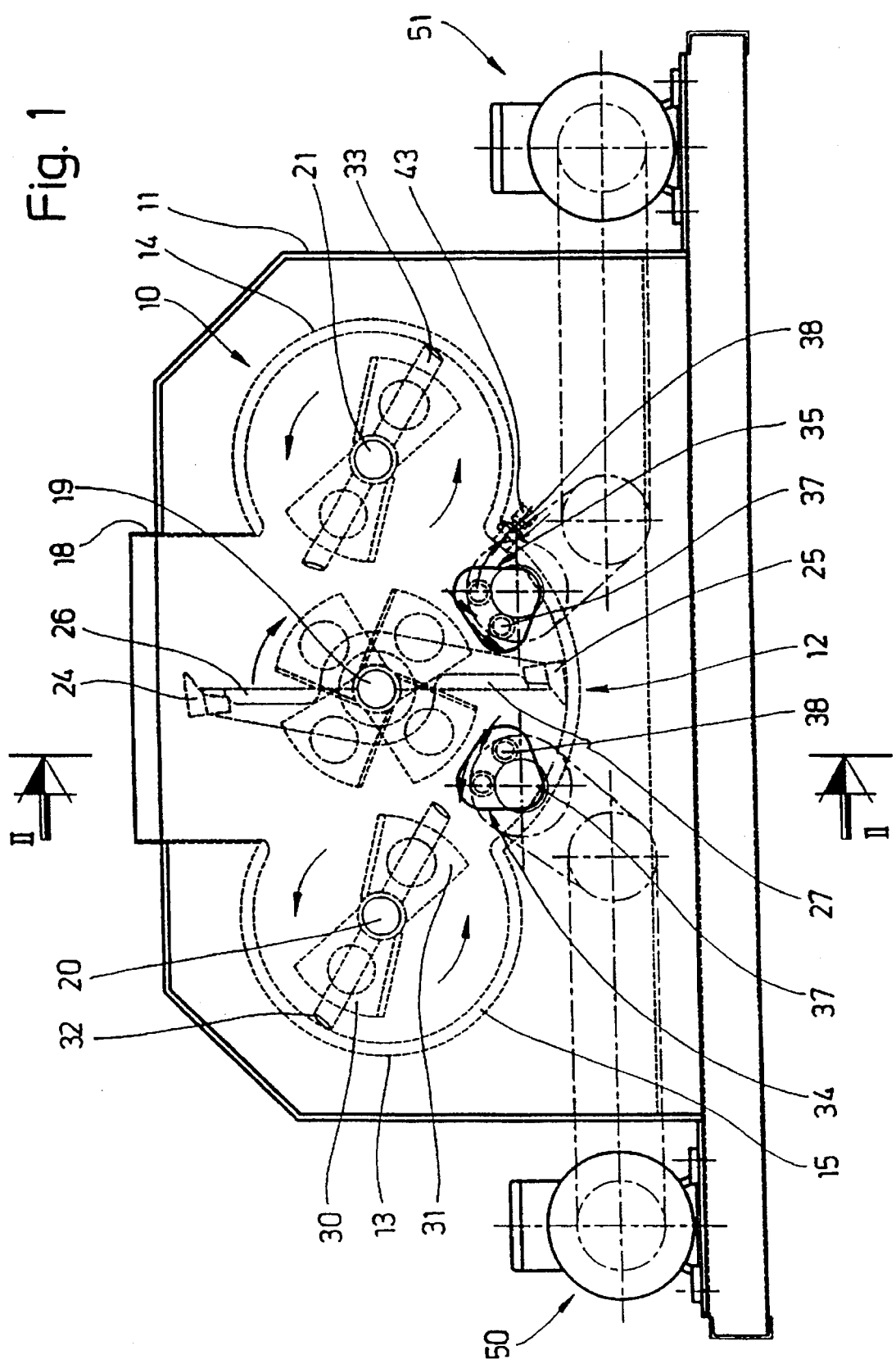
FIG. 1 shows a front end view of a conche.
Figure 2:
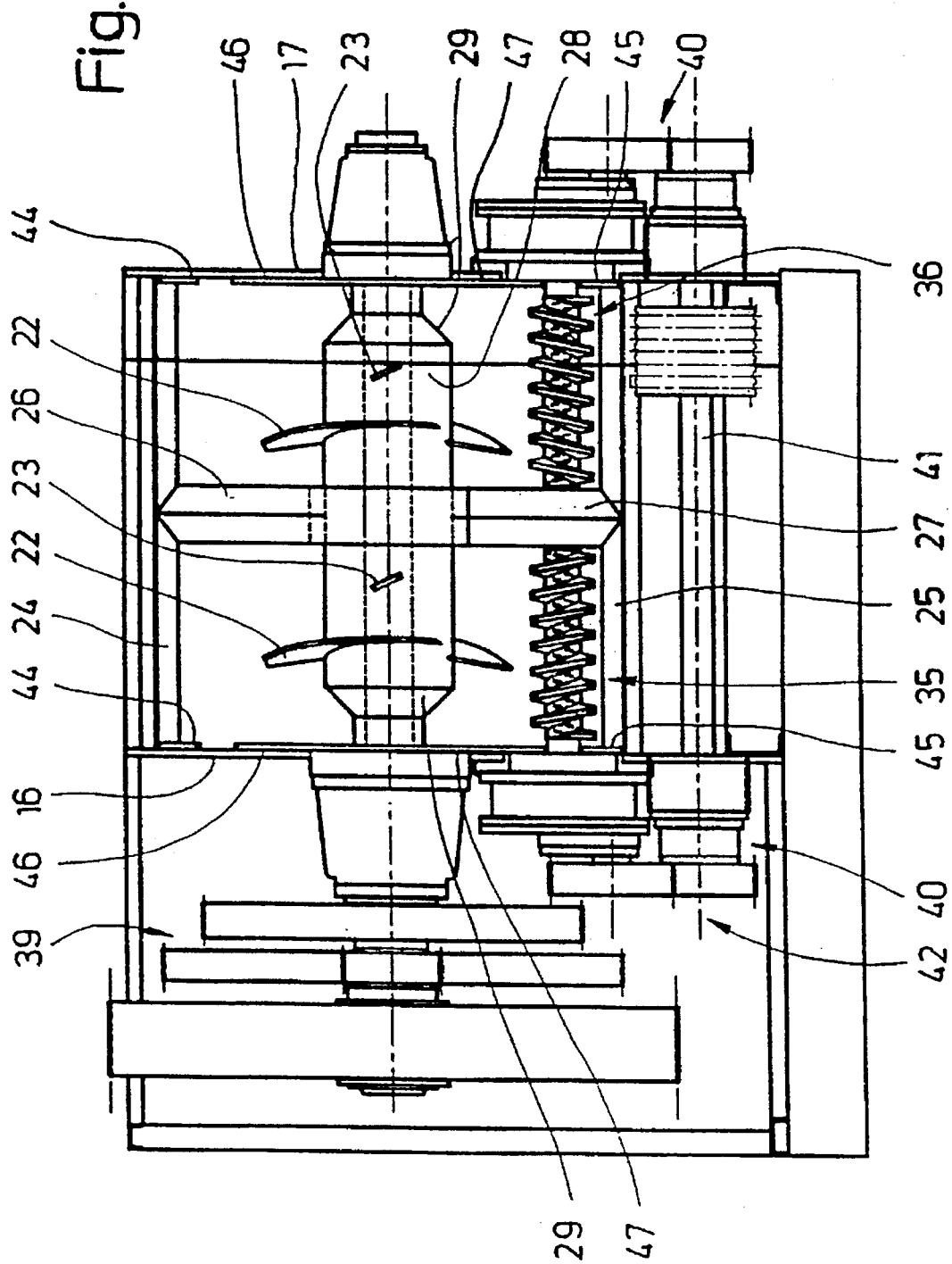
FIG. 2 shows a vertical section taken along the plane II—II of FIG. 1.

In the present exemplary embodiment of a conche, a conche container 10 is disposed in a housing 11. The conche container 10 consists of three chambers, in particular a central main chamber 12 and two axis-parallel subsidiary chambers 13, 14. The main chamber 12 and the subsidiary chambers 13, 14 are formed to be part-cylindrical in cross section. A container wall 15 consists of three part-cylindrical portions.

The conche container 10 is closed at the ends by upright end walls 16, 17.

The starting material for producing chocolate compound is introduced from above into the conche container 10 via a filler opening 18. The filler opening 18 is located in the region of the main chamber 12, usually offset adjacent to one of the end walls 16, 17.

Rotatingly driven mixing devices are mounted in the conche container 10. A main shaft 19 extends in a central longitudinal axis of the main chamber 12. Subisidiary shafts 20 and 21 are disposed axis-parallel thereto in the subsidiary chambers 13, 14, respectively. The shafts 19 . . . 21 are mounted rotatably with their ends in the end walls 16, 17. On the one side of the conche container 10 located outside the container but within the housing 11, a circumferential main gear 39 is disposed, by means of which the main shaft 19 and the subsidiary shafts 20, 21 are driven rotatingly. The drive is effected by two main motors 48, 49. In the present exemplary embodiment, the subsidiary shafts 20, 21 are driven in the opposite direction relative to the main shaft 19.

Mixing tools are disposed on the main shaft 19, in particular several mixing vanes 22, 23 distributed in the longitudinal direction and spaced from one another and pointing in the radial direction. In a vertical transverse plane, two mixing vanes 22 or 23 are located, in each case, opposite to one another, i.e. offset by 180° to one another. In the longitudinal direction of the mainshaft 19, there are located, on the one hand, mixing vanes 22 and, on the other hand, 23, which are spaced apart from one another, that is to say adjacent and are—as a special feature of this conche—offset relative to one another in the peripheral direction. This results in an improved mixing effect and at the same time stabilizes the adsorbed motor power.

Stripping means 24, 25 are also supported on the main shaft 19. These are elongated scrapers which have a wedge-shaped cross section and which are moved in the axis-parallel position at a small distance along the inner side of the inner container wall 15. The two stripping means 24, 25 which are offset in the peripheral direction by 180° extend over the entire length of the main chamber 12.

The stripping means 24, 25 are supported in each case via a radially directed supporting arm 26, 27 on the main shaft 19. Each stripping means 24, 25 is connected to the main shaft via such a supporting arm 26, 27, in particular in the region of an approximately central transverse plane of the housing 11. Accordingly, the stripping means 24, 25 extend at both sides of the radially outward ends of the supporting arms 26, 27. They are formed with a wedge-shaped profile to guarantee an optimal and intensive feeding of the worm units 34, 35 and 36.

To absorb without any problems the increased strain on the main shaft 19 effected by the stripping means 24, 25 being supported solely in the middle of the shaft, the main shaft 19 is provided nearly over the entire length with a thickening 28 to increase the section modulus. In the present case, this thickening is formed from a hollow cylinder which is placed in a fitting manner on the actual main shaft 19 and attached thereto. Tapered pieces 29 are located at the ends of the cylindrical thickenings 28 to form a transition to the end portion of the main shaft 19. The thickening 28 fills a dead space forming during the mixing process within the main chamber 12. In this exemplary embodiment, the mixing vanes 22, 23 are attached to the thickening 28.

In the present case, the subsidiary chambers 13, 14 are formed in the usual manner with regard to the design and arrangement of mixing tools, in particular with diametrically opposed mixing vanes 30, 31 on the subsidiary shafts 20, 21. Furthermore, stripping means 32; 33 are also provided in the subsidiary chambers 13, 14.

An important special feature is the arrangement of additional mixing means in the conche container 10. These are disposed in the region of the main chamber 12, in particular in the lower part thereof, in any case clearly below the main shaft 19. The additional mixing means are located in the region between the mixing vanes 22, 23 and the stripping means 24, 25.

Figure 3:
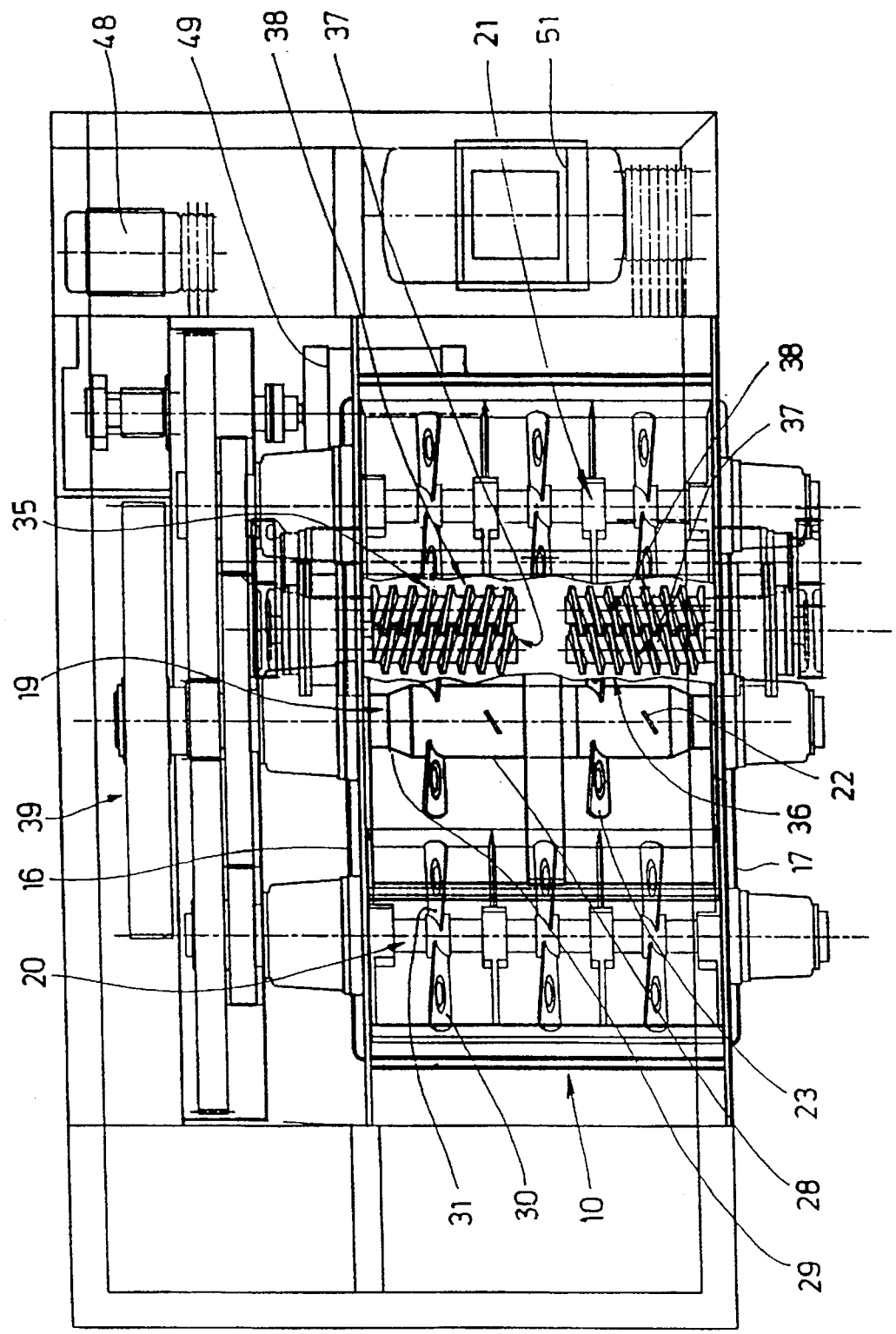
FIG. 3 shows a plan view, partly in horizontal section, of the conche according to FIGS. 1 and 2.

In the exemplary embodiment shown, mixing worms are provided as additional mixing means which are installed at a distance from the lower part of the container wall 15 parallel to the main shaft 19. In the present case, there are altogether four worm units 34, 35 and 36, each having two mixing worms 37, 38. To provide a clearer representation, however, only two equi-axially directed worm units 35, 36 are shown in FIG. 3. The two mixing worms 37, 38 which form a worm unit 34 . . . 36 each are disposed at a small distance from one another, such that the worm spirals of the adjacent mixing worms 37, 38 intermesh or engage one another. The mixing worms 37, 38 of each mixing unit 34 . . . 36 are disposed in the region of the lower curved container wall 15 at equal distances therefrom, i.e. offset vertically relative to one another. Accordingly, the mixing worms 37, 38 are located on an (imaginary) circular path. The worm spirals of adjacent mixing worms 37, 38 of each worm unit 34, 35 and 36 extend at a certain lead angle parallel to one another. The worm spirals of equi-axially arranged worm units 34, 35 or 36 extend in a mirror-invertedly manner with respect to a horizontal line. Accordingly, imaginary extensions of the worm spirals of equi-axially arranged worm units include the double lead angle.

The arrangement of the mixing worms 37, 38 or worm units 34, 35, 36 in the lower region of the conche container 10 results in a considerable improvement of the mixing effect. The starting material filled in from above is subjected to a mixing process even when the conche container 10 is filled only partially. Moreover, the mixing worms 37, 38 have a fine-mixing effect which, together with the coarse-mixing effect of the mixing vanes 22, 23 and the stripping means 24, 25, effects a surprisingly intimate mixing of the components.

The mixing worms 37, 38 are arranged and designed with respect to the method of operation of the worm spirals in such a way that, as a result of an appropriate direction of rotation during mixing there is a movement of the mixing material in the direction towards the central transverse plane of the conche container 10. Accordingly, in the lower region of the conche container 10 the mixing material is always fed into the working region of the mixing tools which are disposed on the main shaft 19. The two mixing worms 37, 38 of a worm unit 34, 35, 36 always rotate in the same direction of rotation. The mixing worms 37, 38 of equi-axially arranged worm units 34, 35 or 36 also rotate in the same direction of rotation. The direction of rotation of the mixing worms 37, 38 is in this case opposed to the direction of rotation of the main shaft 19.

The mixing worms 37, 38 of the worm units 34, 35, 36 are mounted at one end only and are rotatingly driven, in particular at or in the end walls 16, 17. Accordingly, two of these worm units 34 . . . 36 extend, in each case, from both end walls 16, 17 with two mixing worms 37, 38 each in the form of freely projecting mixing means. The mixing worms 37, 38 extend in each case directly up to region of movement of the supporting arms 26, 27. As a result, the mixing worms 37, 38 take effect practically over the entire length of the conche container 10, i.e. the main chamber 12, with the exception of the central region in which the supporting arms 26, 27 revolve.

The mixing worms 37, 38 of each worm unit 34 . . . 36 are driven from outside the conche container 10. An (electric) drive motor 50, 51 for the mixing worms 37, 38 is disposed at each side of the conche outside the housing 11. Each drive motor 50, 51 is connected to a drive shaft 41. This shaft is assigned in each case to the two worm units 34, 35 or 36 which are locatd at the same side with respect to a vertical mid-plane of the main chamber 12. Accordingly, the two equi-axially arranged worm units 34, 35 or 36 are each driven by one drive shaft 41. The drive shaft 41 is located outside the conche container 10, but within the housing 11. Ends of the drive shaft 41 which project from the housing are each connected to a toothed gearing 42 which takes effect on the ends of the mixing worms 37, 38 mounted in the end walls 16, 17.

The special mixing effect of the mixing worms 37, 38 allows the feeding of well-measured doses of cocoa butter and lecithin, whereby a smaller proportion of these components required for the chocolate compound is sufficient. Whereas cocoa butter and lecithin are usually fed in from above via the filler opening 18, in the present conche these components are introduced in the lower region of the conche container, in particular in the lower part of the main chamber 12. The container wall 15 of this chamber is provided with one or several filler necks 43 for cocoa butter and/or lecithin. The introduction of these substances takes place during a relatively long phase of the mixing process or during the whole mixing process. This allows the introduction of a smaller quantity of cocoa butter with the achievement of the same effect and, besides, a reduction of the duration of the plastifying process. In order to introduce cocoa butter and/or lecithin in a distributed manner, several filler necks 43 are expediently disposed in the longitudinal direction of the main chamber 12 on the container wall 15. The filler necks 43 are provided with suitable controllable dosing means.

In the present conche, an optimal stripping of the mixing material from the walls of the conche container 10 is also provided. The cylindrically formed portions of the container wall 15 are kept clear by the stripping means 24, 25. At the ends of these means there are short transversely directed or radially inwardly directed stripping webs 44. These are flat profiles which take effect on an outward circular strip of the end wall 16, 17 in the region of the main chamber 12.

Accordingly, the stripping webs 44 revolve with the stripping means 24, 25.

In addition thereto, stripping wings 46, 47 are provided on both end walls, in particular in a radially inward region. These wings are mounted on the main shaft 19 and rotate therewith as stripping means on the end walls 16, 17. An intermediate space is formed between the stripping webs 44, 45 and the stripping wings 46, 47, and the mixing worms 37, 38 are mounted in the region of this space. Accordingly, the stripping webs 44, 45 are moved past the radially outward and the stripping wings 46, 47 past the radially inward side of the mixing worms 37, 38.

The described conche can work in a batch-like or in a contiuous mode of operation, especially as provided in the conche according to DE 40 21 305 (corresponding to U.S. Pat. Nos. 5,320,427 and 5,215,771).

What is claimed is:

1. A device for mixing conching components for the production of chocolate compound, said device comprising:
   a) a substantially cylindrical conche container (10) containing a driven central main shaft (19) which is rotatable about a horizontal axis in a central main chamber of the conche container (10);
   b) a plurality of mixing tools (22, 23), disposed on the main shaft (19), for mixing the components in a first area of movement revolving near the main shaft (19);
   c) stripping means (24, 25), rotatably arranged in the conche container (10), (24, 25) which revolve along an inner cylindrical surface of the conche container (10) and thus take effect in a peripheral area of movement near said cylindrical surface; and
   d) in the conche container (10), additional mixing means (37, 38) having a second area of movement which is located between said first area of movement of said mixing tools (22, 23) and the peripheral area of movement of the stripping means (24, 25), and having a separate drive.

2. The device according to claim 1, characterized in that the additional mixing means are disposed in a region below the main shaft (19), between, on the one hand, said first area of movement of the mixing tools (22, 23) on the main shaft (19) and, on the other hand, the stripping means (24, 25).

3. The device according to claim 1, characterized in that the additional mixing means are rotatingly driven mixing worms (37, 38) which extend axis-parallel relative to the main shaft (19) in the main chamber (12).

4. The device according to claim 3, characterized in that mixing worms (37, 38) are part of worm units (34, 35, 36) each of which has two said intermeshing mixing worms (37, 38), and are respectively disposed at both sides of an imaginary vertical longitudinal mid-plane of the main chamber (12).

5. Device according to claim 4, characterized in that each mixing worm (37, 38) is mounted rotatingly with one end only in one of two opposite end walls (16, 17) of the conche container (10), and extends projecting therefrom in an axis-parallel direction relative to the main shaft (19) almost to the middle of the conche container (10).

6. The device according to claim 4, characterized in that the mixing worms (37, 38) are drivable by a separate drive, and in that the worm units (34, 35; 36) are in each case associated on one side of a vertical longitudinal mid-plane of the main chamber (12) with a separate drive motor (50, 51) which takes effect on a drive shaft (41) for in each case two equi-axially worm units (34, 35; 36).

7. The device according to claim 3, characterized in that said stripping means (24, 25) extend radially outward and are supported at least in the main chamber (12) with radially directed supporting arms (26, 27) in a region of a central transverse plane of the main chamber (12) on said main shaft (19), with the supporting arms (26, 27) revolving in a free space formed between confronting ends of the mixing worms (37, 38).

8. The device according to claim 7, characterized in that the stripping means (24, 25) extend at both sides of the radially outward ends of the supporting arms (26, 27) in the axial direction of the conche container (10), and extend over the entire axial length of the main chamber (12).

9. The device according to claim 5, characterized in that radially inwardly directed strippers are disposed at free ends of the stripping means (24, 25), and are in the form of stripping webs (44, 45) which take effect on the inner side of the container end walls (16, 17) in a region between, on the one hand, the mixing worms (37, 38) and, on the other hand, an axially extending lateral wall (15) of the container (10).

10. The device according to claim 5, characterized in that stripping wings for an inner side of the container end walls (16, 17) are disposed at least in the main chamber (12) on opposite ends of the main shaft (19).

11. Device according to claim 10, characterized in that the stripping wings (46, 47) have a smaller radial dimension than the main chamber (12), such that the stripping wings (46, 47) are movable past the mixing worms (37, 38) during the rotating movement.

12. Device according to claim 7, characterized in that the main shaft (19) is formed almost over its entire length with a thickening (28) of the loadable cross section to receive the supporting arms (26, 27), with the supporting arms (26, 27) being connected to the thickening (28).

13. Device according to claim 12, characterized in that said mixing tools (22, 23) of the main shaft (19) are disposed on the thickening (28).

14. The device according to claim 4, characterized in that lecithin and/or cocoa butter are feedable to the conche container (10) in a lower region of the main chamber (12), at a small distance from the vertical longitudinal mid-plane of the main chamber (12) via filler necks (43) fitted in said lower region.

15. The device according to claim 1, characterized in that axially adjacent ones of the mixing tools on the main shaft (19) are peripherally offset by 90° relative to each other.

16. The device according to claim 1, wherein:

a) the conche container (10) comprises three axis parallel cylindrical chambers: said central main chamber (12) with a comparatively larger diameter, and two comparatively smaller lateral subsidiary chambers (13, 14);

b) said three chambers (12, 13, 14) merge into one another and at least said main chamber is open at a top thereof;

c) in each of said three chambers (12, 13, 14), said mixing tools (22, 23, 30, 31) are arranged on rotatingly driven shafts (19, 20, 21).

d) said main shaft (19) extends within said main chamber (12) and axis parallel thereto; and e) said stripping means (24, 25) revolve along the inner cylindrical surface of the main chamber (12).

17. The device according to claim 3, wherein said mixing worms convey the components in a direction towards the center of said conche container.

* * * * *